United States Patent
Antoine et al.

(10) Patent No.: US 9,822,883 B2
(45) Date of Patent: Nov. 21, 2017

(54) LOAD RING FOR SEAL ASSEMBLY AND SEAL ASSEMBLY OF MACHINE

(71) Applicant: Caterpillar Inc., Peoria, IL (US)

(72) Inventors: Darren B. Antoine, East Peoria, IL (US); Sunil I. Mathew, Peoria, IL (US); Pradeep Chapagain, Peoria Heights, IL (US); Brian S. Skauge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/361,637

(22) Filed: Nov. 28, 2016

(65) Prior Publication Data

US 2017/0152951 A1    Jun. 1, 2017

Related U.S. Application Data

(60) Provisional application No. 62/261,626, filed on Dec. 1, 2015.

(51) Int. Cl.
*B62D 55/088* (2006.01)
*F16J 15/34* (2006.01)
*B62D 55/15* (2006.01)
*F16J 15/36* (2006.01)
*B62D 55/06* (2006.01)

(52) U.S. Cl.
CPC .......... *F16J 15/344* (2013.01); *B62D 55/088* (2013.01); *B62D 55/15* (2013.01); *F16J 15/36* (2013.01); *B62D 55/06* (2013.01)

(58) Field of Classification Search
CPC ..... F16J 15/3436; F16J 15/3464; B62D 55/15
See application file for complete search history.

(56) References Cited

U.S. PATENT DOCUMENTS

| 3,241,844 | A |   | 3/1966  | Morley |
| 3,291,493 | A |   | 12/1966 | Blair |
| 4,083,569 | A |   | 4/1978  | Negro |
| 4,094,514 | A |   | 6/1978  | Johnson |
| 4,094,516 | A |   | 6/1978  | Morley et al. |
| 4,183,542 | A | * | 1/1980  | Quartara ................ F16J 15/344 277/381 |
| 4,189,159 | A | * | 2/1980  | Domes .................. F16J 15/344 277/374 |
| 4,256,315 | A |   | 3/1981  | Larson et al. |
| 5,605,338 | A |   | 2/1997  | Poll |
| 5,763,956 | A |   | 6/1998  | Metz et al. |
| 6,494,459 | B1|   | 12/2002 | Zutz |

(Continued)

*Primary Examiner* — Gilbert Lee
(74) *Attorney, Agent, or Firm* — Leydig, Voit & Mayer, Ltd.

(57) ABSTRACT

A load ring for a seal assembly includes an inner axial surface, an outer axial surface, a first frustoconical surface, a second frustoconical surface, and a rib. The inner and outer axial surfaces are cylindrical and extend along a longitudinal axis. The outer axial surface is in outward radial relationship to the inner axial surface along a radial plane which is perpendicular to the longitudinal axis. The first and second frustoconical surfaces are annular and extend radially between the inner axial surface and the outer axial surface. The second frustoconical surface is in spaced relationship with respect to the first frustoconical surface along the longitudinal axis. The rib projects radially inwardly from the inner axial surface.

5 Claims, 5 Drawing Sheets

(56) References Cited

U.S. PATENT DOCUMENTS

| | | |
|---|---|---|
| 6,955,359 B2 | 10/2005 | Yamamoto et al. |
| 6,976,681 B2 * | 12/2005 | Zutx .................. F16J 15/344 |
| | | 277/358 |
| 7,296,800 B2 | 11/2007 | Tsuboi et al. |
| 8,827,381 B2 | 9/2014 | Dolata |
| 2013/0169034 A1 | 7/2013 | Hisamatsu |
| 2013/0320628 A1 | 12/2013 | Dengler |
| 2015/0061368 A1 | 3/2015 | Liang et al. |
| 2015/0300498 A1 | 10/2015 | Jensen |

* cited by examiner

LOAD RING FOR SEAL ASSEMBLY AND SEAL ASSEMBLY OF MACHINE

CROSS-REFERENCE TO RELATED APPLICATION

This patent application claims the benefit of priority to U.S. Patent Application No. 62/261,626, filed Dec. 1, 2015, and entitled "Load Ring for Seal Assembly and Seal Assembly of Machine," which application is incorporated in its entirety herein by this reference.

TECHNICAL FIELD

This patent disclosure relates generally to a seal assembly for a machine and, more particularly, to a load ring of a seal assembly having a rotary face-to-face contacting relationship via a pair of seal rings.

BACKGROUND

Track-type machines are in widespread use in construction, farming, mining, forestry, and other similar industries. The undercarriage of such track-type machines utilizes track assemblies, rather than wheels, to provide ground-engaging propulsion. Such track assemblies may be preferred in environments where creating sufficient traction is difficult, such as those frequently found in the industries identified above. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, drive sprockets, idlers, tensioners, and rollers, for example.

A seal assembly of the kind employed for retaining lubricant within a sealed cavity and excluding foreign matter from the bearing surfaces between relatively moving parts disposed within the sealed cavity can frequently be used in various applications in the undercarriage, such as, those associated with the track rollers, idlers, and final drive system of the undercarriage, for example. A typical seal assembly can comprise a face-type seal wherein sealing is accomplished by mating surfaces of relatively rotating seal parts of hard material. In seals that employ two rings relatively rotating in face-to-face contact, the production of a seal assembly which will endure and maintain a seal throughout many hours of severe service is highly desired.

U.S. Pat. No. 3,241,844 is entitled, "End Face Seal Assembly with Installation Retention Means." The '844 patent is directed to an end face seal assembly and installation thereof which involves the provision of means forming a part of secondary sealing members of the assembly and capable of maintaining frictional as well as sealing engagement with surface areas on which the secondary sealing members are mounted to prevent displacement of the seal assembly during installation thereof as well as prevent the introduction of foreign matter along an edge portion during operational use of the seal assembly. The secondary sealing member includes a projecting barb or lip-like means located to initially establish and maintain frictional engagement of the secondary sealing member with a part on which the same is mounted.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In embodiments, the present disclosure describes a load ring for a seal assembly. The load ring includes an inner axial surface, an outer axial surface, a first frustoconical surface, a second frustoconical surface, and a rib.

The inner axial surface is cylindrical and extends along a longitudinal axis. The outer axial surface is cylindrical and extends along the longitudinal axis. The outer axial surface is in outward radial relationship to the inner axial surface along a radial plane which is perpendicular to the longitudinal axis. The first frustoconical surface is annular and extends radially between the inner axial surface and the outer axial surface. The second frustoconical surface is annular and extends radially between the inner axial surface and the outer axial surface. The second frustoconical surface is in spaced relationship with respect to the first frustoconical surface along the longitudinal axis. The rib projects radially inwardly from the inner axial surface.

In another embodiment, a seal assembly is described. The seal assembly includes a first member and a second member, a first seal ring and a second seal ring, and a first load ring and a second load ring.

The first member is rotatable about a longitudinal axis with respect to the second member. Each of the first member and the second member includes a load ring engagement surface. The load ring engagement surface of at least one of the first member and the second member defines, at least in part, a seal cavity interposed between the first member and the second member.

The first seal ring and the second seal ring each has a load end and a seal end in spaced relationship to each other along the longitudinal axis, a loading surface extending along the longitudinal axis, and a sealing face disposed at the seal end and extending radially with respect to the longitudinal axis. The first seal ring and the second seal ring abut one another such that the sealing face of the first seal ring and the sealing face of the second seal ring are in contacting relationship with each other.

The first load ring engages the load ring engagement surface of the first member and the loading surface of the first seal ring. The second load ring engages the load ring engagement surface of the second member and the loading surface of the second seal ring.

At least one of the first load ring and the second load ring includes an inner axial surface, an outer axial surface, a first frustoconical surface, a second frustoconical surface, and a rib. The inner axial surface is cylindrical and extends along the longitudinal axis. The outer axial surface is cylindrical and extends along the longitudinal axis. The outer axial surface is in outward radial relationship to the inner axial surface along a radial plane which is perpendicular to the longitudinal axis. The first frustoconical surface is annular and extends radially between the inner axial surface and the outer axial surface. The second frustoconical surface is annular and extends radially between the inner axial surface and the outer axial surface. The second frustoconical surface is in spaced relationship with respect to the first frustoconical surface along the longitudinal axis. The rib projects radially inwardly from the inner axial surface.

Further and alternative aspects and features of the disclosed principles will be appreciated from the following detailed description and the accompanying drawings. As will be appreciated, the load rings and seal assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Embodiments of a load ring and a seal assembly for a machine are disclosed herein. In embodiments, a seal assembly constructed according to principles of the present disclosure can be used in an undercarriage of a track-type machine. The undercarriage can include track assemblies adapted to engage the ground, or other surface, to propel the track-type machine. Examples of track-type machines include machines used for construction, farming, mining, forestry, and other similar industries. In some embodiments, the machine can be a dozer, loader, excavator, or any other vehicle having a track-type undercarriage.

Figure 1:
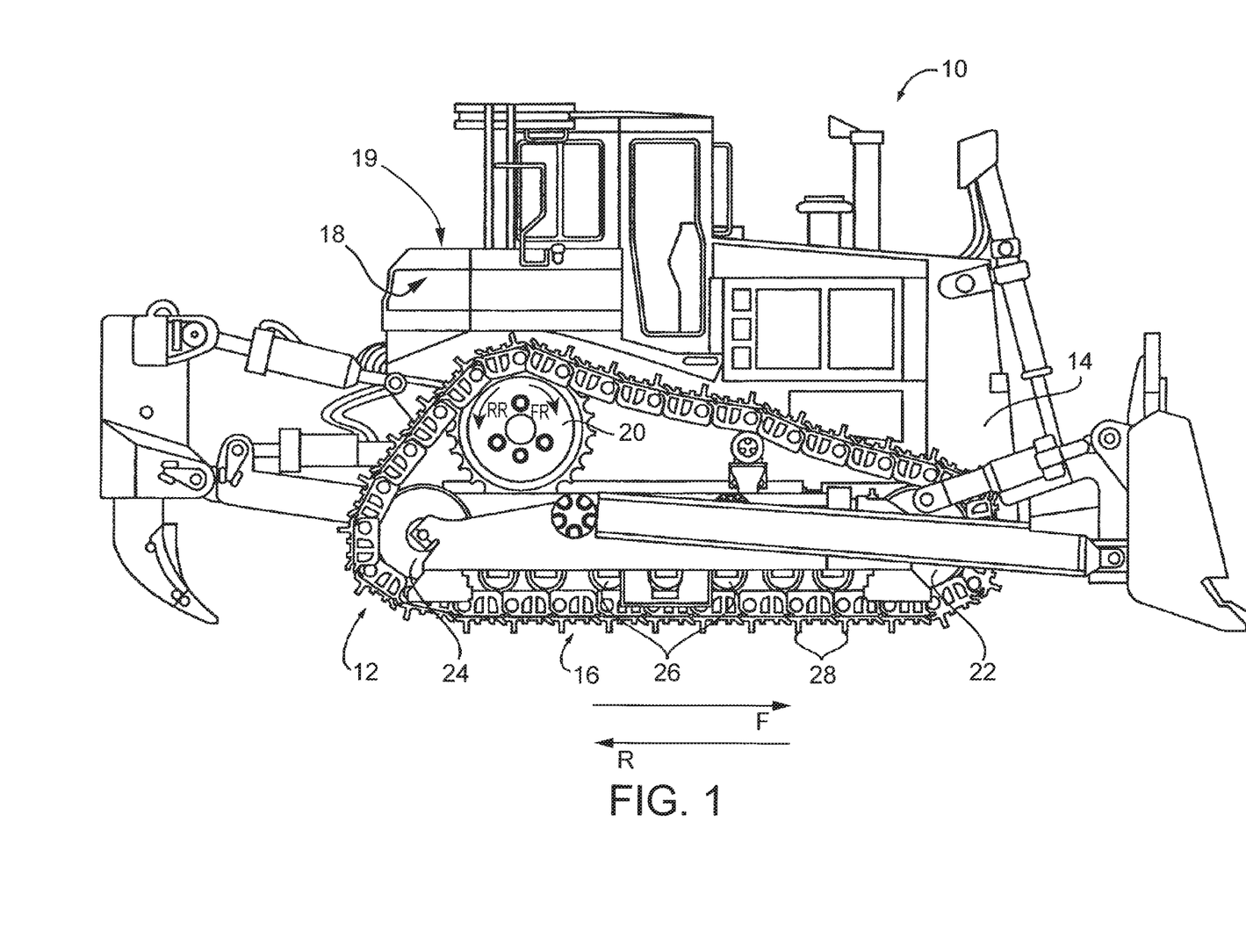
FIG. 1 is a diagrammatic side elevational view of an embodiment of a track-type machine which can include a seal assembly constructed in accordance with principles of the present disclosure.

Turning now to the Figures, there is shown in FIG. 1 an exemplary embodiment of a machine 10 with a track-type undercarriage 12. The machine 10 may also be referenced herein as a track-type machine. In embodiments, the machine 10 may be any suitable machine with a track-type undercarriage, such as, a dozer, loader, excavator, or any other suitable on-highway or off-highway vehicle.

The machine 10 includes a frame 14 having a first track chain assembly 16 disposed on a first side 18 thereof, and a second track chain assembly (not shown) disposed on a second side 19 thereof. The second side 19 is in opposing relationship to the first side 18. Together, the track assemblies are adapted to engage the ground, or other surface, to propel the machine 10.

It should be appreciated that the track chain assemblies of the machine 10 may be similar and, further, may represent mirror images of one another. As such, only the first track chain assembly 16 will be described herein. It should be understood that the description of the first track chain assembly 16 is applicable to the second track chain assembly, as well.

The first track chain assembly 16 extends about a plurality of rolling elements such as a drive sprocket 20, a front idler 22, a rear idler 24, and a plurality of track rollers 26. The track chain assembly 16 includes a plurality of ground-engaging track shoes 28 for engaging the ground, or other surface, and propelling the machine 10.

During typical operation of the undercarriage 12, the drive sprocket 20 is driven in a forward rotational direction "FR" to drive the track chain assembly 16, and thus the machine 10, in a forward direction "F," and in a reverse rotational direction "RR" to drive the track chain assembly 16, and thus the machine 10, in a reverse direction "R." The drive sprockets 20 of the undercarriage 12 can be independently operated to turn the machine 10.

In embodiments, the machine 10 can be any suitable machine, such as a wheel loader, a backhoe, an excavator, a material handler and the like. While the machine 10 is illustrated in the context of a track-type machine, it should be appreciated that the present disclosure is not thereby limited, and that a wide variety of other machines having tracks are also contemplated within the present context. For example, in other embodiments, the track chain assembly 16 can be included in a conveyor system, as a track for transmitting torque between rotating elements, or in any other application known to those skilled in the art.

In embodiments, the machine 10 comprises other types of equipment that include a joint suitable for use with a seal assembly constructed in accordance with principles of the present disclosure. Examples of other such machines include machines used for compaction, mining, construction, farming, transportation, etc.

Figure 2:
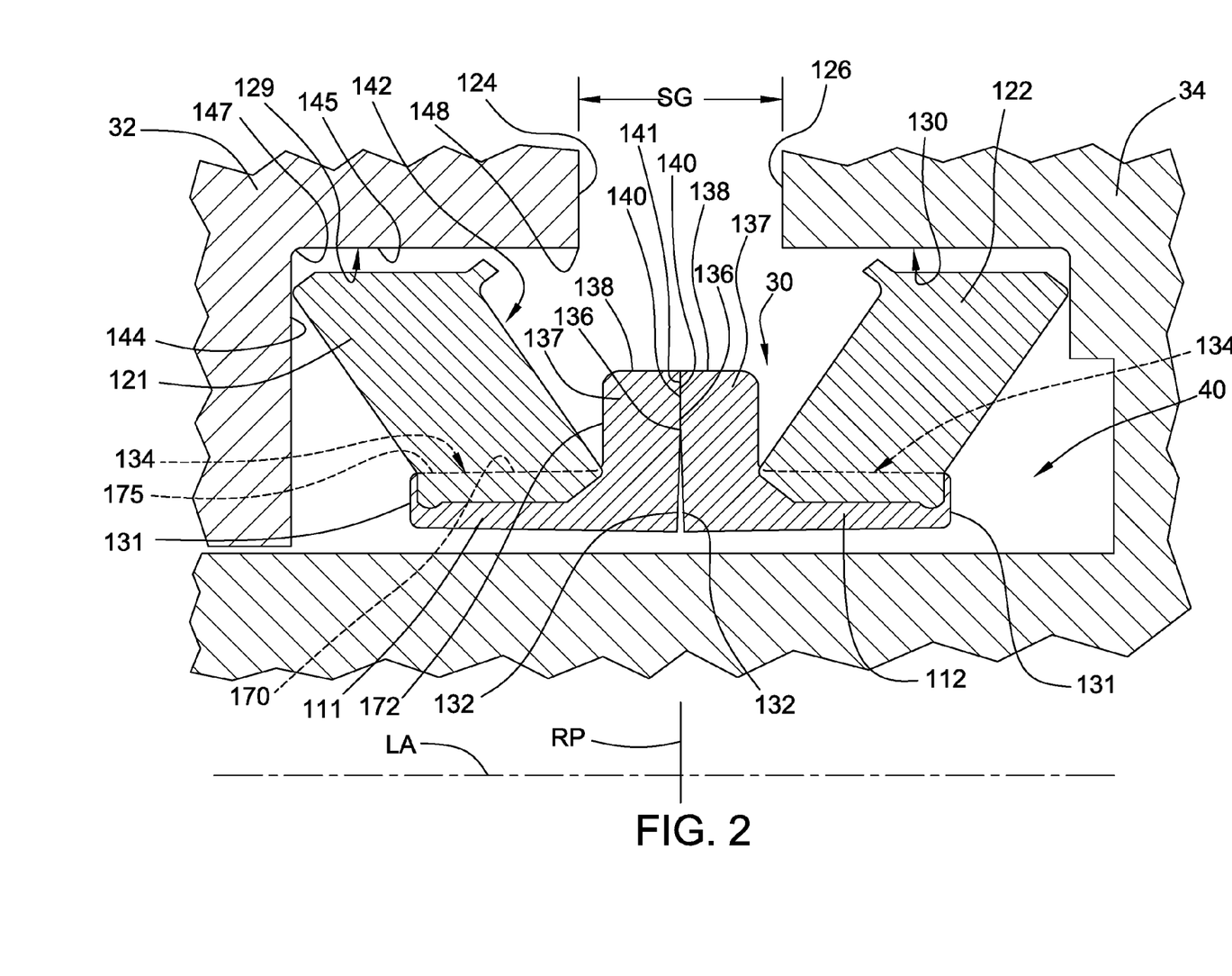
FIG. 2 is a cross-sectional view of an embodiment of a seal assembly constructed in accordance with principles of the present disclosure and suitable for use in the track-type machine of FIG. 1, a pair of load rings of the seal assembly being shown in an uninstalled state in comparison to a pair of seal rings of the seal assembly.

Referring to FIG. 2, in embodiments, the machine 10 includes an embodiment of a seal assembly 30 constructed according to principles of the present disclosure that provides a running seal between a first member 32, which in the illustrated embodiment is in the form of a roller, and a second member 34, which in the illustrated embodiment is in the form of a shaft. The second member (shaft) 34 is fixed relative to the first member (roller) 32 such that the first member 32 is rotatable with respect to the second member 34 about a rotational axis which is aligned with a longitudinal axis "LA" defined by the second member 34 in the form of the shaft. The seal assembly 30 is disposed between the first member 32 and the second member 34. The seal assembly 30 illustrated in FIG. 2 is in the form of a heavy-duty dual-face seal.

The seal assembly 30, which is in the form of a metal-to-metal face seal assembly, is disposed in a seal cavity 40 axially extending between the first member 32 and the second member 34. In embodiments, the seal assembly 30 can be used to retain lubricant radially within the seal assembly 30 and to prevent dirt and other contaminants from entering the seal assembly 30.

While the present disclosure may be implemented in the context of a track roller assembly, it is not thereby limited. In other embodiments, a seal assembly constructed according to principles of the present disclosure can be used in other applications, as will be recognized by one skilled in the art. A wide variety of other applications are contemplated, including track seals, carrier roller seals, pin joint assemblies and cartridges, final drive arrangements, auger drive/support arrangements, and other suitable machine system applications wherein rotatable seal assemblies are utilized.

The first and second members 32, 34 are rotatable relative to one another about the longitudinal axis "LA" with the seal assembly 30 providing a means for fluidly sealing the first member 32 and the second member 34 with a running seal therebetween. In embodiments, the second member 34 can comprise a component mounted to the frame 14 or otherwise stationary with respect to the frame 14, and the first member 32 can comprise a component which is rotatably movable with respect to the second member 34 about the longitudinal axis "LA." In other embodiments, the first member 32 can be stationary and the second member 34 is rotatable with respect to the frame 14. It should be understood, therefore, that the use of the terms "first," "second," and the like herein is for convenient reference only and is not limiting in any way.

Referring to the embodiment illustrated in FIG. 2, the first member 32 is rotatable about the longitudinal axis "LA" with respect to the second member 34. The first member 32 and the second member 34 are disposed in spaced relationship to each other along the longitudinal axis "LA" such that they are separated by a seal gap distance "SG." During use, the first member 32 and the second member 34 can move axially with respect to each other along the longitudinal axis "LA," thereby varying the seal gap distance "SG." In embodiments, the seal gap distance "SG" can have a nominal length that is different from that shown in FIG. 2.

The seal assembly 30 includes first and second seal rings 111, 112 and first and second load rings 121, 122, which are all annular. The first and second seal rings 111, 112 and the first and second load rings 121, 122 are disposed in the seal cavity 40 between the first member 32 and the second member 34. The first and second seal rings 111, 112 of the seal assembly 30 are disposed in abutting relationship with each other. The first and second load rings 121, 122 are respectively mounted to the first and second seal rings 111, 112. The first and second seal rings 111, 112 can be made from any suitable material, such as a metal alloy or a ceramic material, for example. In embodiments, the first and second seal rings 111, 112 can be made from a suitable nickel alloy or iron alloy. The first and second load rings 121, 122 are preferably made from a suitable elastomeric material (e.g., nitrile; low temperature nitrile; hydrogenated nitrile (HNBR); silicone; or fluoroelastomer (FKM), such as Viton™ fluoroelastomers commercially available from The Chemours Company of Wilmington, Del.

The seal assembly 30 employs dual cones in the form of the first and second seal rings 111, 112. In the seal assembly 30, the first load ring 121 acts as a gasket and sealingly engages the first member 32 and the first seal ring 111 to provide a fluid-tight seal therebetween. The second load ring 122 acts as a gasket and sealingly engages the second member 34 and the second seal ring 112 to provide a fluid-tight seal therebetween.

An outboard end portion 124 of the first member 32 is in proximal relation to an inboard end portion 126 of the second member 34. Each of the outboard end portion 124 of the first member 32 and the inboard end portion 126 of the second member 34 includes a load ring engagement surface 129, 130. The load ring engagement surfaces 129, 130 of the first member 32 and the second member 34 define, at least in part, the seal cavity 40, which extends axially along the longitudinal axis "LA" and is interposed between the first member 32 and the second member 34.

The load ring engagement surfaces 129, 130 are generally annular and are coaxial with the longitudinal axis "LA." In the illustrated embodiment, the load ring engagement surfaces 129, 130 each maintains the respective cross-sectional shape shown in FIG. 2 substantially continuously over the entire circumference circumscribed around the longitudinal axis "LA" by the first and second members 32, 34.

The first and second seal rings 111, 112 are substantially identical to each other. The first and second seal rings 111, 112 are each in the form of an annulus. The first and second seal rings 111, 112 each has a load end 131 and a seal end 132 in spaced relationship to each other along the longitudinal axis "LA," a loading surface 134, which is axially extending, and a sealing face 136, which is disposed at the seal end 132 and extends radially with respect to the longitudinal axis "LA" along a radial plane "RP," which is substantially perpendicular to the longitudinal axis "LA." The first seal ring 111 and the second seal ring 112 abut one another such that the sealing faces 136 of the first seal ring 111 and the second seal ring 112 are in contacting relationship with each other.

The sealing face 136 is defined by a seal flange 137, which is radially extending. The sealing faces 136 of the first and second seal rings 111, 112 form a radially-extending annulus and are in sealing relationship with each other.

Each sealing face 136 extends radially to an outer perimeter 138. Each sealing face 136 has a sealing band 140 disposed adjacent the outer perimeter 138. The first and second seal rings 111, 112 abut one another such that the sealing bands 140 of the first and second seal rings 111, 112 are in contacting relationship with each other to define a band 141 of contact between the sealing bands 140.

Axial loading of the first and second seal rings 111, 112 along the longitudinal axis "LA" is accomplished by means of the first and second load rings 121, 122. The first and second load rings 121, 121 are respectively mounted to the first and second seal rings 111, 112. The first and second load rings 121, 122 resiliently support the first and second seal rings 111, 112, respectively. The loading surfaces 134 are formed along the outside surface of the first and second seal rings 111, 112 to receive the first and second load rings 121, 122, respectively. The first load ring 121 engages the loading surface 134 of the first seal ring 111, and the second load ring 122 engages the loading surface 134 of the second seal ring 112 (see FIG. 7).

The load ring engagement surfaces 129, 130 of the first member 32 and the second member 34 are similar to each other. The loading surfaces 134 of the first and second seal rings 111, 112 are substantially identical to each other. Accordingly, it should be understood that the description below of the load ring engagement surface 129 of the first member 32 and the loading surface 134 of the first seal ring 111 is applicable respectively to the load ring engagement surface 130 of the second member 34 and the loading surface 134 of the second seal ring 112, as well. Furthermore, the description of the relationships between the first member 32, the first load ring 121, and the first seal ring 111 are also applicable to the relationships between the second member 34, the second load ring 122, and the second seal ring 112, as well.

The load ring engagement surface 129 of the first member 32 and the loading surface 134 of the first seal ring 111 are in confronting, spaced apart relationship such that they define an annular load ring cavity 142 within which the first load ring 121 is disposed.

The load ring engagement surface 129 of the first member 32 extends axially from the outboard end portion 124 thereof and faces radially inwardly. The load ring engagement surface 129 of the first member 32 includes a substantially annular base portion 144 and a substantially cylindrical load ramp portion 145.

The base portion 144 is substantially annular and extends substantially parallel to the radial plane "RP." The load ramp portion 145 is substantially cylindrical and extends circumferentially around the longitudinal axis "LA." The load ramp portion 145 is substantially parallel to the longitudinal axis "LA" and extends axially between a load end 147 and a seal end 148. The load end 147 of the load ramp portion 145 is adjacent the annular base portion 144. The load end 147 of the load ramp portion 145 is further from the sealing face 136 of the first seal ring 111 along the longitudinal axis "LA" than the seal end 148 of the load ramp portion 145.

The loading surface 134 of the first seal ring 111 faces radially outwardly and includes a seal ramp portion 170 and a seating portion 172. The seating portion 172 projects radially outwardly relative to the seal ramp portion 170 and terminates at the outer perimeter 138 of the sealing face 136. The seating portion 172 radially overlaps with the band 141 of contact between the sealing faces 136.

The seal ramp portion 170 of the first seal ring 111 is bounded by the load end 131, which is in distal relationship to the sealing face 136 of the first seal ring 111, and by the seating portion 172. The seal ramp portion 170 of the illustrated embodiment is substantially cylindrical and coaxial with the longitudinal axis "LA." The seal ramp portion 170 comprises an outer sidewall 175 of the first seal ring 111 that defines an outer perimeter of the load end 131 of the first seal ring 111.

Figure 7:
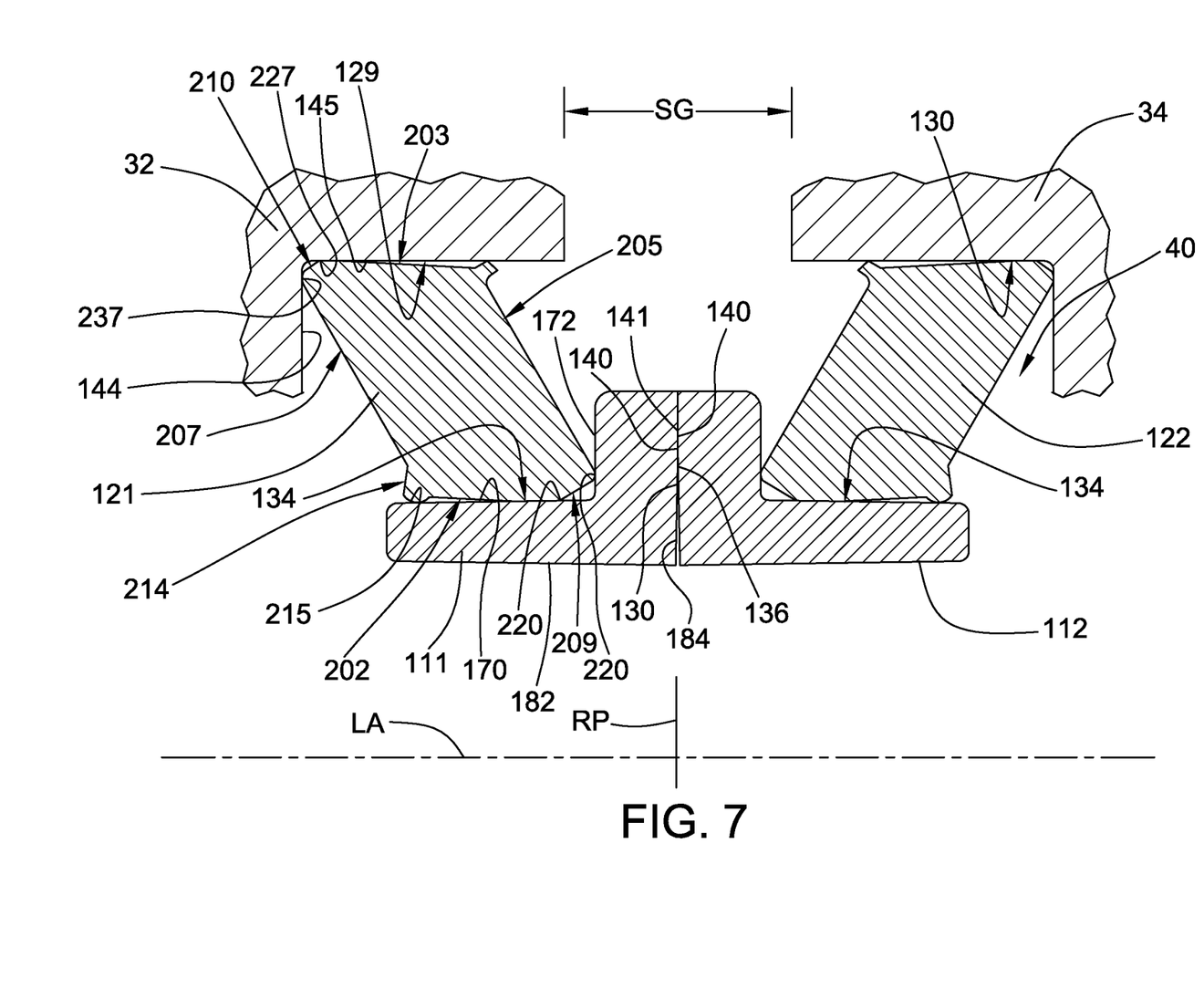
FIG. 7 is a cross-sectional view of the seal assembly of FIG. 2 as in FIG. 2, but illustrating the pair of load rings of the seal assembly in an installed condition.

The load ring engagement surfaces 129, 130 of the first and second members 32, 34 are positioned in corresponding, confronting relationship with respect to the loading surfaces 134 of the first and second seal rings 111, 112 so as to contain the first and second load rings 121, 122, respectively, therebetween (see FIG. 7). Axial loading of the first and second seal rings 111, 112 is thus accomplished through the axial loading of the first and second load rings 121, 122, respectively.

As shown in FIG. 7, the first load ring 121 is compressed such that it engages the load ring engagement surface 129 of the first member 32 and the loading surface 134 of the first seal ring 111. The second load ring 122 is compressed such that it engages the load ring engagement surface 130 of the second member 34 and the loading surface 134 of the second seal ring 112. The first and second load rings 121, 122 are positioned such that they resiliently support the first and second seal rings 111, 112 and drive the sealing faces 136 of the first and second seal rings 111, 112 together to define the band 141 of contact between the sealing bands 140. The first and second load rings 121, 122 act in the manner of a spring to apply an axial load respectively against the first and second seal rings 111, 112 in opposing directions along the longitudinal axis "LA" to bring the sealing faces 136 of the first and second seal rings 111, 112 into face-to-face sealing contact under pressure along the band 141 of contact such that a running, fluid-tight seal is formed.

The first and second seal rings 111, 112 are rotationally movable with respect to each other about the longitudinal axis "LA." In this arrangement, the second seal ring 112 can be considered a stationary seal ring as it is rotatively coupled through the second load ring 122 with the second member 34, which is in the form of a shaft in the illustrated embodiment. The first seal ring 111 can be considered a rotational seal ring as it is coupled through the first load ring 121 with the first member 32, which in the illustrated embodiment is a roller that is rotatably mounted to the second member (shaft) 34 such that it can rotate about the longitudinal axis "LA" relative to the second member 34.

Figure 3:
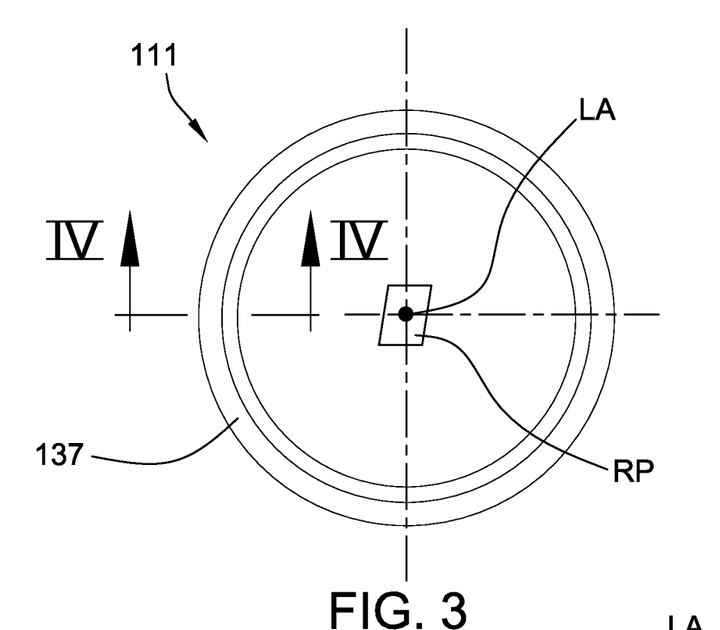
FIG. 3 is an axial face view of a seal ring of the seal assembly of FIG. 2.
Figure 4:
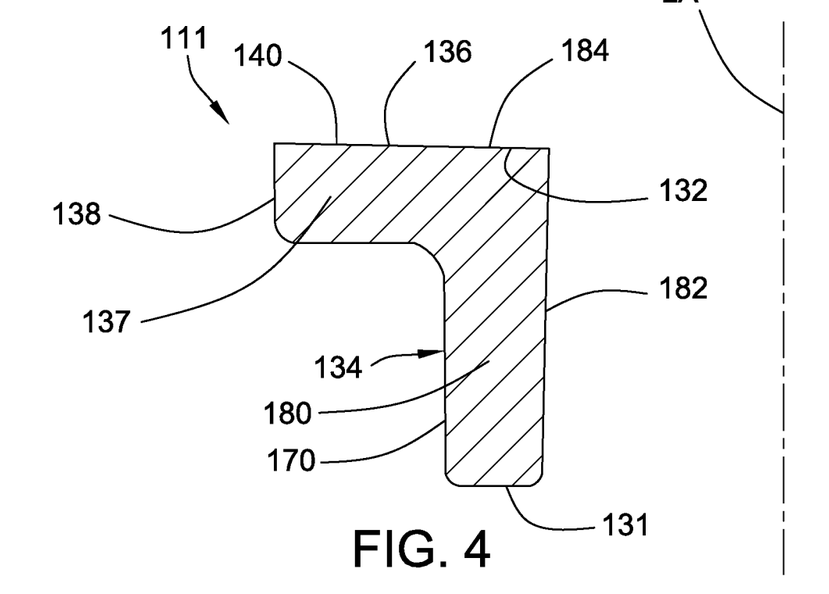
FIG. 4 is an enlarged, cross-sectional view, taken along line IV—IV in FIG. 3, of the seal ring of FIG. 3.

Referring to FIGS. 3 and 4, the first seal ring 111 is shown. The first and second seal rings 111, 112 are substantially identical to each other. It should be understood, therefore, that the description of the first seal ring 111 is applicable to the second seal ring 112, as well. Referring to FIG. 3, the first seal ring 111 is in the shape of an annulus.

Referring to FIG. 4, the first seal ring 111 includes a cylindrical body 180 and the seal flange 137. The cylindrical body 180 extends along the longitudinal axis "LA" between the load end 131 and the seal end 132, which is in opposing relationship to the load end 131. The cylindrical body 180 includes an inner sidewall 182 and the seal ramp portion 170 of the loading surface 134, which is in outer, radial spaced relationship to the inner sidewall 182.

The inner sidewall 182 is substantially frustoconical and is inclined relative to the longitudinal axis "LA" such that the inner sidewall 182 is disposed radially inwardly at the seal end 132 relative to its position at the load end 131. In the illustrated embodiment, the inner sidewall 182 of the first seal ring 111 inclines outwardly relative to the longitudinal axis "LA" in a direction from the seal end 132 toward the load end 131 thereof such that the incline angle is about one degree. In embodiments, the inner sidewall 182 of the first seal ring 111 inclines outwardly relative to the longitudinal axis "LA" in a direction from the seal end 132 toward the load end 131 thereof such that the incline angle is in a range up to about five degrees.

The seal flange 137 is disposed at the seal end 132. The seal flange 137 projects radially from the cylindrical body 180 to the outer perimeter 138 thereof. The sealing face 136 is disposed on the seal flange 137 and extends radially with respect to the longitudinal axis "LA."

The sealing face 136 includes the sealing band 140—which is disposed adjacent the outer perimeter 138 of the seal flange 137—and an inner relieved area 184—which is disposed radially between the sealing band 140 and the inner sidewall 182 of the first seal ring 111 (see also, FIG. 7). The inner relieved area 184 can be tapered between the sealing band 140 and the inner sidewall 182 such that the inner sidewall 182 is axially displaced from the sealing band 140 along the longitudinal axis "LA" (see also, FIG. 7). In embodiments, the sealing band 140 can include an outer relieved area disposed adjacent the outer perimeter 138 that is chamfered or tapered.

Figure 5:
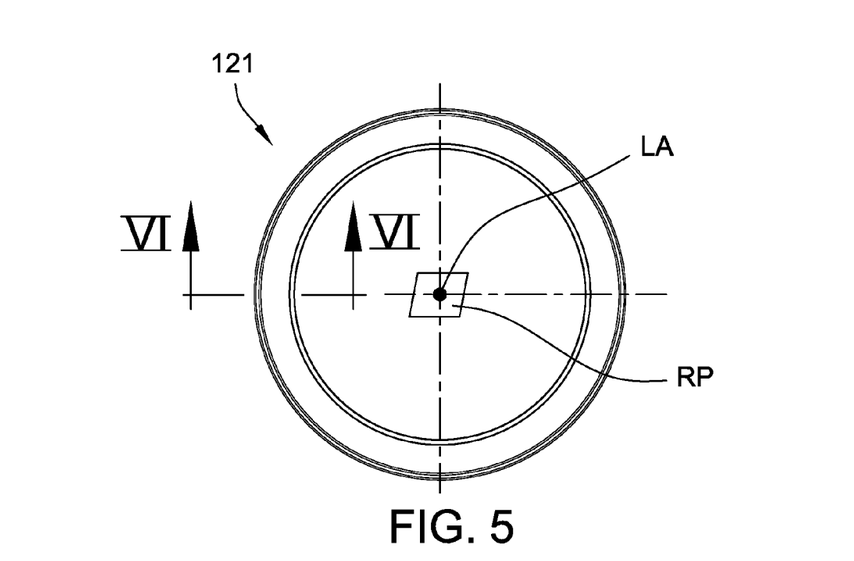
FIG. 5 is an axial face view of a load ring of the seal assembly of FIG. 2 in an unloaded condition.
Figure 6:
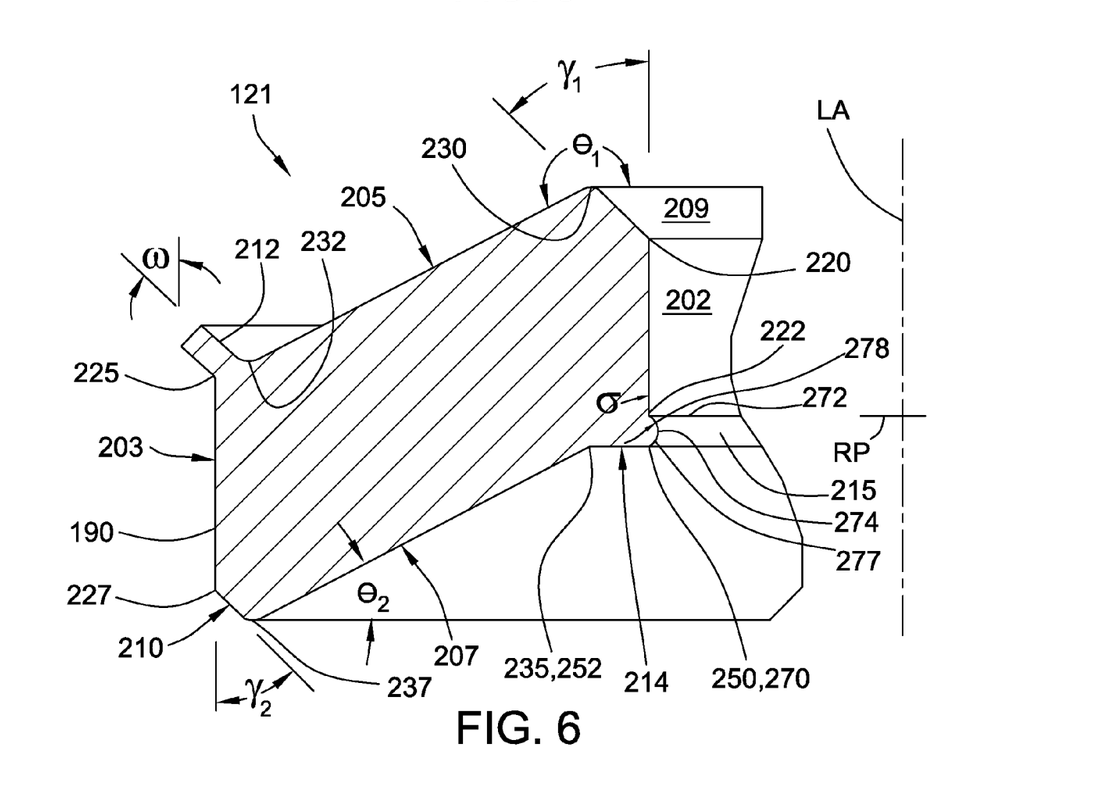
FIG. 6 is an enlarged, cross-sectional view, taken along line VI—VI in FIG. 5, of the load ring of FIG. 5.

Referring to FIGS. 5 and 6, the first load ring 121 is shown. The first and second load rings 121, 122 are substantially identical to each other. It should be understood, therefore, that the description of the first load ring 121 is applicable to the second load ring 122, as well. The first load ring 121 is in the shape of an annulus. When the first load ring 121 is in an unloaded or uncompressed condition, it has a cross-sectional shape 190 as shown in FIG. 6. In the illustrated embodiment, when in the unloaded—or uncompressed—condition, the first load ring 121 has the cross-sectional shape 190 as shown in FIG. 6 substantially continuously around the entire circumference circumscribed around the longitudinal axis "LA" by the first load ring 121.

The first load ring 121 is configured to apply positive sealing engagement against the seal ramp portion 170 of the first seal ring 111. The load ring 121 is also configured to provide at least a predetermined minimum sealing stress over a range of dynamic load conditions. In embodiments, the dynamic load conditions include a range of relative axial movement of the first member 32 with respect to the second member 34 along the longitudinal axis "LA," which in turn varies the seal gap "SG." The load ring 121 illustrated in FIG. 6 includes an inner axial surface 202, an outer axial surface 203, a first frustoconical surface 205, a second frustoconical surface 207, an inner chamfer surface 209, an outer chamfer surface 210, a retention tab 212, an inner base surface 214, and a rib 215.

The inner axial surface 202 is cylindrical and extends along the longitudinal axis "LA." The longitudinal axis "LA" can extend through the radial center defined by the inner axial surface 202. The outer axial surface 203 is cylindrical and extends along the longitudinal axis "LA." The outer axial surface 203 is in outward radial relationship to the inner axial surface 202 along the radial plane "RP," which is perpendicular to the longitudinal axis "LA."

In embodiments, the inner axial surface 202 and the outer axial surface 203 are concentrically disposed about the longitudinal axis "LA." In embodiments, the inner axial surface 202 and the outer axial surface 203 are both substantially parallel to the longitudinal axis "LA." In embodiments, the inner axial surface 202 and the outer axial surface 203 are substantially parallel to each other.

The inner axial surface 202 extends along the longitudinal axis "LA" between an inner seal end 220 and an inner load end 222 thereof. The inner seal end 220 is adjacent the first frustoconical surface 205 such that the inner seal end 220 is axially closer to the first frustoconical surface 205 than the second frustoconical surface 207 along the longitudinal axis "LA." The inner load end 222 is adjacent the second frustoconical surface 207 such that the inner load end 222 is axially closer to the second frustoconical surface 207 than the first frustoconical surface 205 along the longitudinal axis "LA." In the illustrated embodiment, the inner seal end 220 is contiguous with the inner chamfer surface 209, and the inner load end 222 is contiguous with the rib 215.

In embodiments, the size of the first load ring 121 relative to the first seal ring 111 to which it is mounted is controlled so that the first load ring 121 is not too loose—to help prevent it from rotating relative to the first seal ring 111 about the longitudinal axis "LA"—and so that the first load ring 121 is not too tight—to help prevent it from generating too much load. In the illustrated embodiments, the inner axial surface 202 has a diameter that is smaller than the diameter of the outer sidewall 175 of the first seal real ring 111. In embodiments, the inner axial surface 202 of the first load ring 121 has a diameter that is in a range between about two percent and about six percent smaller than the diameter of the outer sidewall 175 of the first seal ring 111 such that the percent the first load ring 121 undergoes to fit over the sidewall 174 of the first seal ring 111 is in a range between about one percent and about three percent. In the illustrated embodiment, the inner axial surface 202 of the first load ring 121 has a diameter that is about four percent smaller than the diameter of the outer sidewall 175 of the first seal ring 111 such that the percent stretch it undergoes to fit over the sidewall 174 of the first seal ring 111 is about two percent.

The outer axial surface 203 extends along the longitudinal axis "LA" between an outer seal end 225 and an outer load end 227 thereof. The outer seal end 225 is adjacent the first frustoconical surface 205 such that the outer seal end 225 is axially closer to the first frustoconical surface 205 than the second frustoconical surface 207 along the longitudinal axis "LA." The outer load end 227 is adjacent the second frustoconical surface 207 such that the outer load end 227 is axially closer to the second frustoconical surface 207 than the first frustoconical surface 205 along the longitudinal axis "LA." In the illustrated embodiment, the outer seal end 225 is contiguous with the retention tab 212, and the outer load end 227 is contiguous with the outer chamfer surface 210.

The first frustoconical surface 205 is annular and extends radially between the inner axial surface 202 and the outer axial surface 203. The second frustoconical surface 207 is annular and extends radially between the inner axial surface 202 and the outer axial surface 203. The second frustoconical surface 207 is in spaced relationship with respect to the first frustoconical surface 205 along the longitudinal axis "LA."

The first frustoconical surface 205 is convex and is in inclined relationship with the radial plane "RP" at a first incline angle $\theta_1$. The second frustoconical surface 207 is concave and is in inclined relationship with the radial plane "RP" at a second incline angle $\theta_2$. In the illustrated embodiment, the first incline angle $\theta_1$ and the second incline angle $\theta_2$ are each oblique. In the illustrated embodiment, the first frustoconical surface 205 and the second frustoconical surface 207 are generally parallel to each other. In the illustrated embodiment, the first incline angle $\theta_1$ is a reflex angle and is greater than the second incline angle $\theta_2$ by about one hundred eighty degrees.

In embodiments, the first incline angle $\theta_1$ is in a range between about twenty degrees and about forty-five degrees, and in a range between about twenty-five degrees and forty degrees in other embodiments. In embodiments, the second incline angle $\theta_2$ is in a range between about one hundred ten degrees and about one hundred thirty-five degrees, and in a range between about one hundred fifteen degrees and about one hundred thirty degrees in other embodiments. In the illustrated embodiment, the first incline angle $\theta_1$ is about thirty degrees, and the second incline angle $\theta_2$ is about one hundred twenty degrees.

The first frustoconical surface 205 extends along the radial plane "RP" between a first inner face end 230 and a first outer face end 232 thereof. The first inner face end 230 is adjacent the inner axial surface 202 such that the first inner face end 230 is radially closer to the inner axial surface 202 than the outer axial surface 203 along the radial plane "RP." The first outer face end 232 is adjacent the outer axial surface 203 such that the first outer face end 232 is radially closer to the outer axial surface 203 than the inner axial surface 202 along the radial plane "RP." In the illustrated embodiment, the first inner face end 230 is contiguous with the inner chamfer surface 209, and the first outer face end 232 is contiguous with the retention tab 212. In the illustrated embodiment, the first inner face end 230 and the inner chamfer surface 209 define a convex curved interface therebetween. In the illustrated embodiment, the first outer face end 232 and the retention tab 212 define a concave curved interface therebetween.

The second frustoconical surface 207 extends along the radial plane "RP" between a second inner face end 235 and a second outer face end 237 thereof. The second inner face end 235 is adjacent the inner axial surface 202 such that the second inner face end 235 is radially closer to the inner axial surface 202 than the outer axial surface 203 along the radial plane "RP." The second outer face end 237 is adjacent the outer axial surface 203 such that the second outer face end 237 is radially closer to the outer axial surface 203 than the inner axial surface 202 along the radial plane "RP." In the illustrated embodiment, the second inner face end 235 is contiguous with the inner base surface 214, and the second outer face end 237 is contiguous with the outer chamfer surface 210. In the illustrated embodiment, the second outer face end 237 and the outer chamfer surface 210 define a convex curved interface therebetween.

In embodiments, the inner chamfer surface 209 can be configured to generate stress concentrations that help promote the sealing engagement between the inner axial surface 202 and the seal ramp portion 170 of the seal ring 111 and between the first frustoconical surface 205 and the seating portion 172 of the seal ring 111 (see FIG. 7). The inner chamfer surface 209 is annular and is interposed between the inner axial surface 202 and the first frustoconical surface 205. The inner chamfer surface 209 is contiguous with the first inner face end 230 of the first frustoconical surface 205 and the inner seal end 220 of the inner axial surface 202.

In embodiments, the outer chamfer surface 210 can be configured to generate stress concentrations that help promote the sealing engagement between the outer axial surface 203 and the load ramp portion 145 of the load ring engagement surface 129 and between the second frustoconical surface 207 and the annular base portion 144 of the load ring engagement surface 129. The outer chamfer surface 210 is annular and is interposed between the second frustoconical surface 207 and the outer axial surface 203. In the illustrated embodiment, the outer chamfer surface 210 is contiguous with the second outer face end 237 of the second frustoconical surface 207 and the outer load end 227 of the outer axial surface 203.

The inner chamfer surface 209 is disposed at a first chamfer angle $\gamma_1$ relative to the inner axial surface 202. The outer chamfer surface 210 is disposed at a second chamfer angle $\gamma_2$ relative to the outer axial surface 203. In the illustrated embodiment, the first chamfer angle $\gamma_1$ and the second chamfer angle $\gamma_2$ are each oblique. In the illustrated embodiment, the inner chamfer surface 209 and the outer chamfer surface 210 are generally parallel to each other such that the first chamfer angle $\gamma_1$ is substantially the same as the second chamfer angle $\gamma_2$.

In embodiments, the first chamfer angle $\gamma_1$ and the second chamfer angle $\gamma_2$ are both in a range between about thirty degrees and about sixty degrees, and in a range between about thirty-five degrees and fifty-five degrees in other embodiments. In the illustrated embodiment, the first chamfer angle $\gamma_1$ and the second chamfer angle $\gamma_2$ are each about forty-five degrees. In other embodiments, the first chamfer angle $\gamma_1$ and the second chamfer angle $\gamma_2$ can be any suitable angle that is configured to help promote stress concentrations that enhance the sealing interface between the load ring 121 and the surfaces to which it is sealingly engaged.

Referring to FIG. 6, the retention tab 212 can be provided to help facilitate the sequential assembly of the seal assembly 30 into the seal cavity 40. The retention tab 212 can engage the load ramp portion 245 of the load ring engagement surface 129 of the first member 32 during the mounting of the first seal ring 111 and the first load ring 121 within the seal cavity 40. The retention tab 212 can help maintain the first seal ring 111 and the first load ring 121 in place relative to the first member 32 even when the second load ring 122 is not urging the second seal ring 112 into contacting relationship with the first seal ring 111.

The retention tab 212 is annular and is interposed between the first frustoconical surface 205 and the outer axial surface 203. In the illustrated embodiment, the retention tab 212 is contiguous with the first outer face end 232 of the first frustoconical surface 205 and the outer seal end 225 of the outer axial surface 203. The retention tab 212 extends radially outwardly relative to the outer axial surface 203.

The retention tab 212 is disposed at a retention tab angle $\omega$ relative to the outer axial surface 203. In the illustrated embodiment, the retention tab angle $\omega$ is about forty-five degrees. In other embodiments, the retention tab angle $\omega$ can be different. For example, in embodiments, the retention tab angle $\omega$ can be in a range between about fifteen degrees and about seventy-five degrees.

The inner base surface 214 can be configured to resiliently support the rib 215 to help maintain a positive seal between the rib 215 and the loading surface 134 of the first seal ring 111 under a range of load conditions (see also, FIG. 7). The inner base surface 214 is annular and is interposed between the inner axial surface 202 and the second frustoconical surface 207. In the illustrated embodiment, the inner base surface 214 is substantially perpendicular to the inner axial surface 202. In the illustrated embodiment, the inner base surface 214 is substantially parallel to the radial plane "RP" and extends radially between an inner base edge 250 and an outer base edge 252. In the illustrated embodiment, the inner base surface 214 extends radially inwardly from the second frustoconical surface 207 to the inner load end 222 of the inner axial surface 202. In the illustrated embodiment, the outer base edge 252 of the inner base surface 214 is contiguous with the second inner face end 235 of the second frustoconical surface 207, and the inner base edge 250 of the inner base surface 214 is contiguous with the rib 215.

The rib 215 is configured to provide a positive sealing connection between the first load ring 121 and the seal ramp portion 170 of the loading surface 134 of the first seal ring 111 (see also, FIG. 7). The rib 215 projects radially inwardly from the inner axial surface 202 and is convex. In the illustrated embodiment, the rib 215 is annular and circumscribes the inner axial surface 202. The rib 215 is disposed adjacent the inner load end 222.

In the illustrated embodiment, the rib 215 has a load edge 270, a seal edge 272, a rib apex 274, a first inclined surface 277, and a second inclined surface 278. The load edge 270 of the rib 215 is axially aligned with the inner base surface 214. The load edge 270 of the rib 215 is contiguous with the inner base edge 250 of the inner base surface 214. The seal edge 272 is in spaced relationship to load edge 270 along the longitudinal axis "LA." The seal edge of the rib 215 is contiguous with the inner load end 222 of the inner axial surface 202.

The first and second inclined surfaces 277, 278 respectively extend between the load edge 270 and the apex 274 and the seal edge 272 and the apex 274. The first and second inclined surfaces 277, 278 shown in FIG. 6 are mirror images of each other with respect to the radial plane "RP."

In embodiments, the second inclined surface 278 defines a rib angle $\sigma$ between the second inclined surface 278 and the inner axial surface 202 in a range between about one hundred twenty degrees and one hundred fifty degrees, and in a range between about one hundred twenty-five degrees and one hundred fifty degrees in other embodiments. In the illustrated embodiment, the rib angle $\sigma$ is about one hundred thirty-five degrees. In embodiments, the first inclined surface 277 can have a mirror image angle that is within similar ranges as those mentioned for the second inclined surface 278.

Referring to FIG. 7, the rib 215 of the first load ring 121 is sealingly engaged with the seal ramp portion 170 of the loading surface 134. In embodiments, the rib 215 can maintain its sealing contact with the seal ramp portion 170 over a range of relative travel of the first member 32 with respect to the second member 34 along the longitudinal axis "LA." The inner chamfer surface 209 helps concentrate sealing stress between the inner seal end 220 of the inner axial surface 202 and the seal ramp portion 170 of the loading surface 134 and between the first inner face end 230 of the first frustoconical surface 205 and the seating portion 172 of the loading surface 134. The outer chamfer surface 210 helps concentrate sealing stress between the outer load end 227 of the outer axial surface 203 and the load ramp portion 145 of the load ring engagement surface 129 of the first member 32 and between the second outer face end 237 of the second frustoconical surface 207 and the base portion 144 of the load ring engagement surface 129.

It should be understood that in other embodiments, a load ring constructed according to principles of the present disclosure can be used in other types of seal assemblies, such as, other configurations of heavy duty dual face metal face seals using Belleville washers; other types of duo-cone seal rings with different loading surfaces and/or sealing faces; and other seals for other seal assemblies, as will be appreciated by one skilled in the art.

INDUSTRIAL APPLICABILITY

The industrial applicability of the embodiments of a load ring for a seal assembly and a seal assembly described herein will be readily appreciated from the foregoing discussion. The described principles are applicable to machines and equipment including an assembly of an undercarriage such that one member is rotatably movable with respect to the other member. A roller assembly can include at least one seal assembly constructed in accordance with the present principles. In other embodiments, a load ring constructed according to principles of the present disclosure can be used in a seal assembly used in a different application. The load rings disclosed herein can advantageously be offered on new equipment, or can be used to retrofit existing equipment operating in the field.

During use, the first and second seal rings 111, 112 help prevent lubricant (not shown) from leaking out of the respective cavities. The first and second seal rings 111, 112 provide a running seal therebetween. Specifically, the first and second seal rings 111, 112 rotate relatively against one another in sealing engagement. The first and second load rings 121, 122 act in the manner of a spring to apply an axial load respectively against the first and second seal rings 111, 112 in opposing directions along the longitudinal axis "LA" to bring the sealing bands 140 of the first and second seal rings 111, 112 into face-to-face sealing contact under pressure such that a running fluid-tight seal is formed. The structure of the seal cavity 40 can help maintain the first and second load rings 121, 122 in proximal relationship to the first and second seal rings 111, 112, respectively, to promote the opposing axial forces exerted by the first and second seal rings 111, 112 against each other. Accordingly, fluid can be restrained from escaping from the seal cavity 40 under difficult loading conditions.

Load rings 121, 122 constructed according to principles of the present disclosure can maintain adequate sealing between the seal rings 111, 112 such that an effective fluid tight seal can be produced readily upon installation of the first and second seal rings 111, 112 in a joint. In embodiments, the load rings 121, 122 can each include a rib 215 that projects radially inwardly from an inner axial surface 202 thereof. Each rib 215 can be configured to provide a positive seal between the load rings 121, 122 and the seal rings 111, 112 to which they are respectively mounted.

In embodiments, each rib 215 helps provide a positive seal at the oil side of the load rings 121, 122 to seal the load ring-seal ring interface. The positive seal provided by the ribs 215 can be maintained over a range of end play (axial motion) between the first and second members such that the coefficient of friction between the load rings 121, 122 and the seal rings 111, 112 to which they are respectively mounted substantially prevents the seal rings 111, 112 from rotating relative to the respective associated load ring 121, 122.

In embodiments, the load rings 121, 122 are configured to provide a predetermined minimum seal stress over a range of load conditions. For example, in embodiments, the load rings 121, 122 can generate a minimum seal stress of 1 MPa over a range of end play between the first member and the second member (which correspondingly varies the seal gap "SG" therebetween).

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:
1. A load ring for a seal assembly, the load ring comprising:
an inner axial surface, the inner axial surface being cylindrical and extending between an inner seal end and an inner load end thereof along a longitudinal axis;
an outer axial surface, the outer axial surface being cylindrical and extending between an outer seal end and an outer load end thereof along the longitudinal axis, the outer axial surface in outward radial relationship and parallel to the inner axial surface along a radial plane, the radial plane being perpendicular to the longitudinal axis;
a first frustoconical surface, the first frustoconical surface being annular and extending between a first inner face end and a first outer face end thereof, and wherein the first frustoconical surface extends radially between the inner axial surface and the outer axial surface;
a second frustoconical surface, the second frustoconical surface being annular and extending between a second inner face end and a second outer face end thereof, and wherein the second frustoconical surface extends radially between the inner axial surface and the outer axial surface, the second frustoconical surface being in spaced relationship with respect to the first frustoconical surface along the longitudinal axis;
a rib, an inner base surface, an outer chamfer surface, a retention tab, and an inner chamfer surface;
the rib projecting radially inwardly from the inner axial surface, wherein the rib is annular, circumscribes the inner axial surface, and includes a load edge, a seal edge, a rib apex, a first inclined surface, and a second inclined surface, and wherein the load edge of the rib is axially aligned with the inner base surface;

the inner base surface being annular, interposed between the inner axial surface and the second frustoconical surface, perpendicular to the inner axial surface, and parallel to the radial plane, wherein the inner base surface extends radially between an inner base edge and an outer base edge, and wherein the outer base edge of the inner base surface is contiguous with the second inner face end of the second frustoconical surface, and the inner base edge of the inner base surface is contiguous with the rib;

the outer chamfer surface being annular and interposed between the second frustoconical surface and the outer axial surface;

the retention tab being annular and interposed between the first frustoconical surface and the outer axial surface, the retention tab extending radially outwardly relative to the outer axial surface;

the inner chamfer surface being annular and interposed between the inner axial surface and the first frustoconical surface;

wherein the inner chamfer surface is disposed at a first chamfer angle relative to the inner axial surface, and the outer chamfer surface is disposed at a second chamfer angle relative to the outer axial surface, the first chamfer angle being substantially the same as the second chamfer angle such that the inner chamfer surface is parallel to the outer chamfer surface;

wherein the first chamfer angle of the inner chamfer surface is configured to generate stress concentrations such that the inner axial surface sealingly engages a seal ramp portion of a seal ring, and such that the first frustoconical surface sealingly engages a seating portion of the seal ring; and wherein the second chamfer angle of the outer chamfer surface is configured to generate stress concentrations such that the outer axial surface sealingly engages a load ramp portion of a load ring engagement surface of a first member, and such that the second frustoconical surface sealingly engages an annular base portion of the load ring engagement surface of the first member.

2. The load ring of claim 1, wherein the first frustoconical surface is in inclined relationship with the radial plane at a first incline angle, and the second frustoconical surface is in inclined relationship with the radial plane at a second incline angle, the first incline angle and the second incline angle each being oblique.

3. The load ring of claim 2, wherein the first incline angle is a reflex angle and is greater than the second incline angle by about one hundred eighty degrees.

4. A seal assembly comprising:
a first member and a second member, the first member being rotatable about a longitudinal axis with respect to the second member, the first member and the second member each including a load ring engagement surface, the load ring engagement surface of at least one of the first member and the second member defining, at least in part, a seal cavity interposed between the first member and the second member;
a first seal ring and a second seal ring, the first seal ring and the second seal ring each having a load end and a seal end in spaced relationship to each other along the longitudinal axis, a loading surface extending along the longitudinal axis, and a sealing face disposed at the seal end and extending radially with respect to the longitudinal axis, the first seal ring and the second seal ring abutting one another such that the sealing face of the first seal ring and the sealing face of the second seal ring are in contacting relationship with each other; and
a first load ring and a second load ring, the first load ring engaging the load ring engagement surface of the first member and the loading surface of the first seal ring, the second load ring engaging the load ring engagement surface of the second member and the loading surface of the second seal ring;
wherein at least one of the first load ring and the second load ring includes:
an inner axial surface, the inner axial surface being cylindrical and extending along the longitudinal axis,
an outer axial surface, the outer axial surface being cylindrical and extending along the longitudinal axis, the outer axial surface in outward radial relationship to the inner axial surface along a radial plane, the radial plane being perpendicular to the longitudinal axis,
a first frustoconical surface, the first frustoconical surface being annular and extending radially between the inner axial surface and the outer axial surface,
a second frustoconical surface, the second frustoconical surface being annular and extending radially between the inner axial surface and the outer axial surface, the second frustoconical surface being in spaced relationship with respect to the first frustoconical surface along the longitudinal axis;
a rib, an inner base surface, an outer chamfer surface, a retention tab, and an inner chamfer surface;
the rib projecting radially inwardly from the inner axial surface, wherein the rib is annular, circumscribes the inner axial surface, and includes a load edge, a seal edge, a rib apex, a first inclined surface, and a second inclined surface, and wherein the load edge of the rib is axially aligned with the inner base surface;
the inner base surface being annular, interposed between the inner axial surface and the second frustoconical surface, perpendicular to the inner axial surface, and parallel to the radial plane, wherein the inner base surface extends radially between an inner base edge and an outer base edge, and wherein the outer base edge of the inner base surface is contiguous with the second inner face end of the second frustoconical surface, and the inner base edge of the inner base surface is contiguous with the rib;
the outer chamfer surface being annular and interposed between the second frustoconical surface and the outer axial surface;
the retention tab being annular and interposed between the first frustoconical surface and the outer axial surface, the retention tab extending radially outwardly relative to the outer axial surface;
the inner chamfer surface being annular and interposed between the inner axial surface and the first frustoconical surface;
wherein the inner chamfer surface is disposed at a first chamfer angle relative to the inner axial surface, and the outer chamfer surface is disposed at a second chamfer angle relative to the outer axial surface, the first chamfer angle being substantially the same as the second chamfer angle such that the inner chamfer surface is parallel to the outer chamfer surface;
wherein the first chamfer angle of the inner chamfer surface is configured to generate stress concentrations such that the inner axial surface sealingly engages a seal ramp portion of one of the first seal ring and the second seal ring, and such that the first frustoconical surface sealingly engages a seating portion of one of the first seal ring and the second seal ring; and wherein the second chamfer angle of the outer chamfer surface is configured to generate stress concentrations such that the outer axial surface sealingly engages a load ramp portion of a load ring engagement surface of one of the first member and the second member, and such that the second frustoconical surface sealingly engages an annular base portion of the load ring engagement surface of one of the first member and the second member.

5. The seal assembly of claim 4, wherein the first load ring and the second load ring are substantially the same, both including the inner axial surface, the outer axial surface, the first frustoconical surface, the second frustoconical surface, and the rib.

* * * * *